United States Patent Office 3,703,404
Patented Nov. 21, 1972

3,703,404
COATED SEEDS AND PROCESS FOR
COATING SEEDS
William W. Kirk, Salinas, Calif., assignor to The Upjohn
Company, Kalamazoo, Mich.
No Drawing. Filed Oct. 30, 1970, Ser. No. 85,757
Int. Cl. A01c 1/06
U.S. Cl. 117—72
41 Claims

ABSTRACT OF THE DISCLOSURE

A new process for coating seeds for planting is described. Seeds are initially coated with finely-ground, porous particles, e.g., heat expanded vermiculite, dampening them only enough to cause the vermiculite particles to adhere to the natural seed coat and to each other. When the seed is completely coated an overcoat is applied. The overcoat comprises finely-ground porous particles applied with a bonding agent comprising about equal parts polyvinyl acetate and polyvinyl alcohol with enough water to make the agent sprayable. Small seeds so coated germinate substantially as quickly as uncoated seeds and total germination is comparable. Small seeded vegetable crops can be planted to a stand with available precision planters.

BACKGROUND OF THE INVENTION

"Seeds are ever a positive and creative force. Seeds are the germ of life, a beginning and an end, the fruit of yesterday's harvest and the promise of tomorrow's. Without an ample store of seeds there can be no national treasure, or no future for a Nation."

Orville L. Freeman.
Agriculture Yearbook
U.S.D.A., 1961

This statement by then Mr. Secretary Freeman harks back to the great influence that the U.S. Patent Office has had in the advancement of American agriculture by collection and distribution of seeds. Beginning in 1839, when Henry L. Ellsworth was Commissioner of Patents, and continuing until 1923, the U.S. Patent Office was a prime moving force in the collection of seeds from everywhere in the world and distribution of them to culturists throughout the United States. Thomas Jefferson wisely said:

"The greatest service which can be rendered to any country is to add a useful plant to its culture."

Plant seeds, which are fertilized ova already somewhat developed morphologically as embryonic plants, usually have more or less of a food supply and a protective seed coat (both angiosperms and gymnosperms). This seed coat provides protection for the food supply (e.g., endosperm and cotyledons) and zygote, and sometimes functions to retard germination until environmental conditions are right. Culturists do not usually attempt to modify the natural seedcoat. An exception is scarification of seeds (e.g., sweet clover) so that they will germinate reasonably promptly.

But in the cultivation of crops for human food supplies there occur circumstances of cultural practice when supplementation of the natural seedcoat is desirable. For example, it is now common practice to coat many crop seeds with a fungicide so that pathogenic fungi in the soil will be controlled in the vicinity of the seeds and the germinating crop plants. The farmer has much better chances of a uniform stand of vigorous plants even though germination be delayed by cold, wet weather in the spring. Seedcoat treatments have been developed for protection against room worms, grubs, birds, and other pests, and for Rhizobia inoculation.

A need for another kind of supplementation of the natural seedcoat arises from the fact that it is not possible to plant very small seeds to a practically precise stand with mechanical planters now available. Seeds of the size of wheat, oats, milo, soybeans, and maize are planted to satisfactory stands by conventional mechanical planters, but apparently, there has not yet been developed a mechanical planter that will reliably and precisely space very small seeds. Accordingly, one way of overcoming the problem is to coat the very small seeds and thus increase their effective size so that each seed can be spaced by precision mechanical planters.

This objective of being able to plant very small seeds to a practically precise stand has now become important in view of labor defaults. People are no longer willing to work in the fields with a hoe or on hands and knees for wage rates consistent with the market value of the prospective vegetable crop. Culturists need a system of planting that will give a uniform, spaced stand of small-seeded, vegetable crops. Representative such crops are onions, lettuce, endive, radishes, carrots, tomatoes, peppers, celery, and spinach. There are many others including flowers. Tobacco with seeds so small that the number varies between 5 and 10 million seeds per lb. (usually over 6 million) is another crop that will benefit from the new seedcoating and process of this invention. As a matter of fact, this invention now provides an open door to further extensions of the seedcoating art to larger seeds, for example, certain tree seeds (e.g., Douglas Fir), maize, muskmelon, cucumbers, beans, and peas.

SUMMARY OF THE INVENTION

This invention pertains to new coated seeds, a new seedcoating, and a new process for accomplishing the same. The invention is more particularly directed to (1) novel coated seeds having a distinct nuclear coat and a bonded overcoat, (2) the new and advantageous seedcoating characterized by a nuclear coat and a bonded overcoat, and (3) the new process of accomplishing the same.

The new seedcoating and new process for accomplishing the same avoid sealing the natural seedcoat with a bonding agent that might tend to restrict exchange of moisture, oxygen, carbon dioxide, and other metabolic products between the germinating seed and its environment. The invention provides a successful coated seed product that can be precision planted to a desired stand thus avoiding uneconomic thinning of densely seeded or crowded plants, and sometimes economically disastrous germination failures of prior art coated seeds.

Plant growth promoting agents can be incorporated in the seedcoating of this invention for early germination and growth enhancement. Pesticides including fungicides, bactericides, nematocides, and bird repellents can also be included. Symbiotic bacteria such as nitrogen fixing bacteria can be incorporated in a viable condition for optimal inoculation and reproduction. Consequently, this invention provides new vistas for agricultural technology.

DETAILED DESCRIPTION OF THE INVENTION

The coated seeds of the present invention are superior to all contemporary and previously described coated seeds, and their uniformity of development most nearly approximates the germination potential of uncoated seeds. There have been in fact some trials wherein the coated seeds of this invention have out-performed a sample of the same seed lot planted under the same conditions without the coating.

The now established superiority of the coated seeds of the present invention appears to be the result of several innovations over previous coating practice. The new seed coating utilizes, instead of clays, a porous, particulate matter. Porosity is critical because the germinating seed must be able to respire (exchange $O_2$ and $CO_2$) through the coat, and soil moisture must be able to reach the seed itself.

A seed coating must be porous and yet strong enough to withstand tumbling about. Accordingly, a non-sealing, but sufficiently strong bonding agent must be used. The bonding agent of this invention produces an adequately strong, non-shattering overcoat that is porous and readily disintegrated by the action of soil moisture. Thus, there appear to be substantial advantages to the new mixture of polyvinyl acetate and polyvinyl alcohol as employed in the seed coating and process of this invention. The polyvinyl acetate provides strength, and the polyvinyl alcohol provides tackiness and advantageous disintegration of the coating in the presence of soil moisture.

Another innovation is a nuclear coating that avoids contacting or in any way sealing the natural seedcoat with the bonding agent. This nuclear coat is built-up by conventional coating techniques advantageously using water as the adhering agent. Other suitable adhering agents include dilute, e.g., 3–5%, solutions of methylcellulose or hydroxypropyl methylcellulose in water. It has been found that finely-ground heat-expanded vermiculite having particles ranging from about $1.0\mu$ (micron) up to about $30\mu$ are suited for the nuclear coat of this invention. A preferred range of particle sizes is between 10 and 30 microns, but slightly larger and smaller particle sizes can be used. The larger sizes of vermiculite and other finely-ground porous particles are useful in the process especially if the particles have physical properties either naturally or created that promote attraction to the seed to be coated and aid in building up the coat. A slightly broader preferred range of particle sizes is from about $1.0\mu$ to about $100\mu$.

After the nuclear coat is formed and the natural seedcoat is protected from sealing by the bonding agent, an overcoat is applied. This overcoat is bonded with the mentioned mixture of polyvinyl acetate and polyvinyl alcohol which provides strength and the desired disintegration. Since the coated seeds of this invention will usually be shipped, handled, and planted with mechanical devices and be subjected to rough handling, the overcoat must be adequately strong. Polyvinyl alcohol alone will not provide adequate strength even though its tackiness is advantageous and it is water soluble. Polyvinyl alcohol has the disadvantage of being relatively impervious to gases.

In accordance with this invention it has been found that polyvinyl acetate, although not desirably water soluble, having a propensity for glazing, and lacking wet tackiness, nevertheless, contributes valuable strength characteristics to a seed coating when applied as an aqueous emulsion with polyvinyl alcohol. The process of the invention employs a mixture of about 0.5 to about 1.5 parts polyvinyl acetate, about 0.5 part to about 1.5 parts polyvinyl alcohol, and about 7 to 9 parts water (parts are by weight). A preferred proportion is about equal parts polyvinyl acetate and polyvinyl alcohol with water enough to preserve tackiness but permit spray mist application.

Advantageously, the polyvinyl acetate emulsion has a viscosity between 700 and 2500 (cps. at 25° C.) and an average particle size of 1 to 2.0 microns. Other viscosities and particle sizes can be used when compensating adjustments are made in other components of the bonding agent. For example, more or less polyvinyl alcohol for tackiness can be used, or more or less water for fluidity can be used. A preferred embodiment of the invention employs a polyvinyl alcohol having a molecular weight range of 2000 to 10,000 and, preferably, about 40 percent residual acetate groups. These two adhesives, polyvinyl acetate and polyvinyl alcohol when mixed 1 part:1 part with 8 parts water produces a specifically preferred bonding agent in accordance with this invention. This aqueous mixture is fluid enough for optimal mist spraying, it sets up quickly, produces an adequately strong coat, and apparently provides adequate moisture penetration and disintegration, adequate respiration for the germinating seed, and no adverse toxicity. If desired, a plasticizing component such as glycol can be included.

In accordance with the coating process of this invention, the bonding agent as described is mist-sprayed on a batch of nuclear coated mixing and tumbling seeds in such small amounts at a time as to avoid glazing the seed coat. Only enough is applied at any given time that will promote building up of the porous particles on the coat but will not cement seeds to seeds or produce erratic centers of agglomeration. In the developmental practice of the invention an operator with a conventional coating pan can coat two 25 lb. batches of seeds in a 4 hr. interval. The operator should be advantageously skilled so that he can recognize the progressing qualities of the coat and adjust the quantity of mist-spray and porous particles additions to obtain a uniformly progressive build up of the seedcoat. The process of the invention can be advantageously effected with 50, 100, 200, 500, and even 1000 lb. batches of seed in newly developed thin-layer, concentric shell mixers.

In general, in accordance with the process and seed-coating of this invention the objective amount of bonding agent in the finished coat is about 5 percent. Accordingly about 19 parts of a porous, particulate matter is bonded with 1 part of bonding agent. This proportion can be varied, of course, if desired. For example, if one utilizes a tacky component in the bonding agent compatible with the polyvinyl acetate and polyvinyl alcohol, such as starch and dextrins, coated seeds with less than 5 percent resin solids can be produced. Furthermore, some varieties of seeds can be coated more heavily than others without adversely affecting early germination and growth capabilities.

The coated seeds of this invention can vary in size from $\frac{1}{16}''$ up to $\frac{1}{2}''$ and even larger depending upon the size of the original seeds and the variety of plants. Very small seeds are advantageously coated to a size that will pass through a screen having $\frac{8}{64}''$ or $\frac{10}{64}''$ round holes. A minimum coated seed that will pass through a screen having $\frac{6}{64}''$ round holes is also produced. The choice of coated seed size will depend upon the original size of the seed, the variety's sensitivity to coating, the precision planters available, and the characteristics of planting conditions (irrigation v. soil dryness). In a specific illustration, celery seed is coated to a size about 0.0714 inch and beet seeds are coated to 0.1875 inch.

When incorporation of a fungicide, nematocide, growth regulant, or a symbiotic bacteria is desired in the seed coating of this invention the component is preferably adsorbed on the porous coating particles before they are bonded into the coat. Alternatively, a component can be slowly added as the overcoat is built up. The seed coating of this invention is particularly advantageous for the incorporation of a symbiotic bacteria with seeds, e.g., nitrogen fixing bacteria with legume seeds. Fertilizers can also be incorporated in growth stimulating yet nontoxic amounts.

Those skilled in the art will readily recognize obvious equivalents of the foregoing description. For example, it will be readily recognized that the nuclear coated seeds can be impressed in a moulded body of porous particles bonded by the new polyvinyl acetate:polyvinyl alcohol bonding agent of this invention. Such moulded bodies may be shaped like tablets, capsules, wafers, or rods. The preferred shape being dependent, illustratively, upon the kind of planting equipment available and the original shape of the seeds. Rod-shaped bodies containing nucelar coated seeds are readily prepared by injecting the nuclear coated seed into a rod-shaped body as it is being extruded from a die.

EXAMPLE 1

Twenty-five lbs. of lettuce seeds averaging about 500,000 seeds per lb. are poured into a conventional capsule coating pan rotating at the speed of 25–30 r.p.m. The mixing and tumbling mass of seeds is very slightly dampened with water applied as a spray mist. Then a smaller amount of finely-ground expanded vermiculite is added. (The vermiculite particles range in size from 5 to $30\mu$ with 99% less than $25\mu$.) After an interval, during which the mixing and tumbling is continued, the seeds take up the fine vermiculite and the mass appears uniform. More spray mist and the vermiculite are added. Dampening, adding the finely-ground, expanded vermiculite, and mixing and tumbling is repeated until a thin but complete coating is built up with the individual seeds as a nucleus. The coated seeds at this stage will pass through a $\frac{2}{64}$–$\frac{3}{64}$ round hole.

From this point on, a bonding agent is spray misted over the mixing and tumbling nuclear coated seeds as the vermiculite is added. The bonding agent comprises a mixture of essentially 10 percent medium molecular weight polyvinyl acetate having a viscosity of 1500–2200 cps. at 25° C. and an average particle size of 1.5 microns, 10 percent polyvinyl alcohol having an average molecular weight of 3000 and about 37–42 percent residual acetate, and 80 percent water plus minor components of the polyvinyl acetate emulsion and polyvinyl alcohol powder used for making the bonding agent. Building up of the bonded overcoat continues until the coated lettuce seeds screened through a $\frac{9}{64}''$ round hole but over a $\frac{7 \cdot 5}{64}''$ round hole. The thus-coated seeds are dried and packaged for distribution and planting.

EXAMPLE 2

Following the same procedure as Example 1, above, but substituting onion seeds, carrot seeds, cabbage seeds, celery seeds, radish seeds, spinach seeds, endive seeds, beet seeds, parsley seed, and tomato seeds, respectively, for the lettuce seeds, there is produced the same type of coated seeds of each specified vegetable.

EXAMPLE 3

Following the procedure of Example 1, above, but substituting finely-ground expanded perlite, finely-ground corn cob pith, finely-ground polyurethane, and finely-ground diatomaceous earth, respectively, for the finely-ground expanded vermiculite, there is obtained coated seeds of substantially the same germination and growth capability.

EXAMPLE 4

Coated carrot (variety Gold Pak) seeds prepared according to the procedure of Example 1, above, were compared with a sample of the same seed batch, uncoated, according to conventional germination test procedures [see Lovato, Amaducci, and Venturi, Proc. Int. Seed Test Ass. 35: pp. 439–445 (1970)]. The test results were as follows:

|  | First count | Percentage germination | Abnormal | Dead |
|---|---|---|---|---|
| Uncoated seed sample | 78 | 94 | 1 | 5 |
| Coated seed sample | 63 | 90 | 1 | 9 |

EXAMPLE 5

Coated onion seeds (varieties Hybrid Topas, Hybrid Granada, Ruby and Southport White Globe) prepared according to the procedure of Example 1, above, were compared with samples of the same seed batch, uncoated, according to conventional germination test procedures. The test results obtained were as follows:

|  | First count | Percentage germination | Abnormal | Dead |
|---|---|---|---|---|
| Hybrid Topaz, uncoated | 97 | 98 | 2 |  |
| Hybrid Topaz, coated | 94 | 98 | 1 | 1 |
| Hybrid Granada, uncoated | 81 | 85 | 7 | 8 |
| Hybrid Granda, coated | 82 | 85 | 6 | 9 |
| Ruby uncoated | 83 | 85 | 8 | 7 |
| Ruby, coated | 82 | 86 | 8 | 6 |
| Southport White Globe, uncoated | 97 | 98 | 1 | 1 |
| Southport White Globe, coated | 95 | 96 | 4 | 0 |

EXAMPLE 6

Coated tomato seeds (variety VF 145B-7879) prepared according to the procedure of Example 1, above, were compared with a sample of the same seed batch, uncoated, according to conventional germination test procedures. The test results obtained were as follows:

|  | First count | Percentage germination | Abnormal | Dead |
|---|---|---|---|---|
| Uncoated seed sample | 96 | 97 | 2 | 1 |
| Coated seed sample | 91 | 97 | 1 | 2 |

EXAMPLE 7

Coated tomato seeds (varieties VF 145–B–7, VF 145B–7879, and VF 145–21–4 Select) prepared according to the procedure of Example 1, above, but size-screened through $\frac{8}{64}''$ round holes and over $\frac{6}{64}''$ round holes, were compared with samples of the same seed batch, uncoated, according to conventional germination test procedures. The test results obtained were as follows:

|  | First count | Percentage germination | Abnormal | Dead |
|---|---|---|---|---|
| VF 145 B7, uncoated | 92 | 97 | 0 | 3 |
| VF 145 B7, coated | 86 | 97 | 1 | 2 |
| VF 145 B7879, uncoated | 93 | 97 | 2 | 1 |
| VF 145 B7879, coated | 88 | 98 | 1 | 1 |
| VF 145–21–4 Select, uncoated | 84 | 96 | 1 | 3 |
| VF 145–21–4 Select, coated | 84 | 96 | 1 | 3 |

EXAMPLE 8

Coated endive seed (variety Green curled Ruffec) prepared according to the procedure of Example 1, above, were compared with a sample of the same seed batch, uncoated, according to conventional germination test procedures. The test results obtained were as follows:

|  | First count | Percentage germination | Abnormal | Dead |
|---|---|---|---|---|
| Uncoated sample | 85 | 92 | 3 | 5 |
| Coated sample: |  |  |  |  |
| Top of blotter test | 74 | 92 | 1 | 7 |
| Top of sand test | 82 | 93 | 1 | 6 |

EXAMPLE 9

Following the same procedure as Example 1, above, but substituting a more coarsely ground vermiculite in the overcoat having particles ranging from about 25–30μ up to about 100μ in size for the finely-divided vermiculite, there is prepared coated seeds having the same germination and growth capability.

EXAMPLE 10

Following the procedure of Example 1, above, but substituting a 3% solution of hydroxypropyl methyl cellulose in water there is produced nuclear coats constituting 5, 10, 15, 20, and 25 percent of the total seed coat. The germination potential and uniformity of growth is the same as in Examples 4 through 8 above.

I claim:

1. A process for coating seeds which comprises applying to the seeds a fragile, relatively thin but complete, nuclear coat of a porous particulate matter initially adhered by essentially water, and applying an overcoat of a porous, particulate matter bonded with a mixture of polyvinyl acetate, polyvinyl alcohol, and water in proportions of about 0.5 to 1.5 parts acetate, 0.5 to 1.5 parts alcohol, and 7 to 9 parts water.

2. The process of claim 1 wherein the nuclear coat comprises from about 5 percent to about 25 percent of the total coat.

3. The process of claim 2 wherein the nuclear coat on lettuce seeds comprises about 10 percent of the total coat.

4. The process of claim 2 wherein the porous particulate matter is a finely-ground heat-expanded vermiculite having a particle size ranging from about 1.0μ to 100μ.

5. The process of claim 4 wherein the particle size ranges from 5μ to 30μ and 99 percent are less than 25μ.

6. The process of claim 5 wherein the seeds average about 500,000 seeds per pound.

7. The process of claim 6 wherein the coated seeds pass through a 9/64" round screen but over a 7.5/64" round screen.

8. The process of claim 6 wherein the coated seeds pass through a 9/64" round screen but pass over a 1/16" round screen.

9. The process of claim 1 wherein the seeds are of a size in the range of about 100,000 to about 5 million seeds per pound.

10. The process of claim 9 wherein the seeds average about 500,000 seeds per pound.

11. A seed coating that consists of a fragile, relatively thin but complete, nuclear coating built up on a seed nucleus, characterized by finely-divided, porous particles initially adhered by essentially water, and a relatively strong overcoating built up of porous particles bonded with a mixture comprising about 0.5 to 1.5 parts polyvinyl acetate, 0.5 to 1.5 parts polyvinyl alcohol, and 7 to 9 parts water, said nuclear coating comprising about 5 percent to about 25 percent of the seed coating.

12. The seed coating according to claim 11 wherein the nuclear, finely-divided, porous particles and the overcoated porous particles are a heat-expanded naturally occurring mineral.

13. The seed coating according to claim 12 wherein the heat-expanded naturally occurring mineral is vermicullite.

14. The seed coating according to claim 13 wherein the vermiculite particles range in size from about 1.0μ to about 100μ.

15. The seed coating according to claim 14 wherein the vermiculite particles range in size from about 5μ to 30μ and 99 percent of the particles are less than 25μ.

16. The seed coating according to claim 11, wherein the bonding agent comprises about 1 part polyvinyl acetate, about 1 part polyvinyl alcohol, and about 8 parts water.

17. The seed coating according to claim 16 wherein the polyvinyl acetate has a viscosity, cps. at 25° C., of about 700 to 2500.

18. The seed coating according to claim 17 wherein the polyvinyl alcohol has a molecular weight range of about 2000 to 10,000 and has about 40 percent residual acetate.

19. The seed coating according to claim 18 wherein the bonding agent comprises about 5 percent of the seed-coat.

20. The seed coating according to claim 11 wherein the finely-divided porous particles are an organic material.

21. The seed coating according to claim 20 wherein the organic material is finely ground corn cobs.

22. Coated seeds characterized by a fragile, relatively thin but complete, nuclear coat of finely-divided porous particles applied with an adhering agent comprising essentially water, and a substantially thicker, relatively strong overcoat of porous particles applied with a mixture initially comprising about 10 percent polyvinyl acetate, about 10 percent polyvinyl alcohol, and about 80 percent water as the bonding agent.

23. Coated seeds according to claim 22 wherein the polyvinyl alcohol has an average molecular weight of 2000 to 10,000 and about 37–42 percent residual acetate.

24. Coated seeds according to claim 23 wherein the polyvinyl acetate has a medium molecular weight.

25. Coated seeds according to claim 22 wherein the finely-divided, porous particles are heat-expanded vermiculite.

26. Coated seeds according to claim 25 wherein the heat-expanded vermiculite ranges in size from 1μ or less up to about 100μ.

27. Coated seeds according to claim 26 wherein the nuclear coat comprises vermiculite particles ranging in size from about 5μ to 30μ, 99% being less than 25μ.

28. Coated seeds according to claim 27 wherein both the nuclear and the overcoat comprise vermiculite particles ranging in size from 5μ to 30μ, 99 percent being less than 25μ.

29. Coated seeds characterized by a relatively thin, fragile, but complete nuclear coat of a porous particulate matter initially adhered by essentially water, and a substantially thicker, relatively strong overcoat of porous, particulate matter initially bonded with a mixture of polyvinyl acetate, polyvinyl alcohol, and water in proportions of about 0.5 to 1.5 parts the acetate, 0.5 to 1.5 parts the alcohol, and 7 to 9 parts water.

30. Coated seeds according to claim 29 wherein the nuclear coat comprises from about 5 percent to about 25 percent of the whole coating.

31. Coated seeds according to claim 30 wherein the nuclear coat comprises 10 percent of the whole coating.

32. Coated seeds according to claim 29 wherein small seeds averaging about 500,000 seeds per lb. have a nuclear coating of finely-divided porous mineral particles and the bonding mixture comprises essentially about 10 percent polyvinyl acetate, about 10 percent polyvinyl alcohol and about 80 percent water.

33. Coated seeds according to claim 32 small enough to pass through a screen 9/64" round holes; but pass over a screen 7.5/64" round holes.

34. Coated seeds according to claim 32 wherein the finely-divided, porous mineral particles are heat expanded vermiculite having a particle size ranging from about 1.0μ to about 100μ.

35. Coated seeds according to claim 34 wherein the particle size ranges from 5μ to 30μ and 99 percent are less than 25μ.

36. Coated lettuce seed according to claim 35.

37. Coated seeds according to claim 32 wherein the polyvinyl acetate has a viscosity, cps. at 25° C., of about 700 to 2500.

38. Coated seeds according to claim 37 wherein the polyvinyl alcohol has a molecular weight range of about 2000 to 10,000 and has about 37–42 percent residual acetate.

39. Coated seeds according to claim 38 wherein the bonding agent comprises about 5 percent of the seedcoat.

40. Coated seeds according to claim 29 wherein the porous particulate matter is an organic material.

41. Coated seeds according to claim 40 wherein the organic material is finely ground corn cobs.

References Cited

UNITED STATES PATENTS

| | | | |
|---|---|---|---|
| 3,545,129 | 12/1970 | Schreiber et al. | 117—3 X |
| 3,561,159 | 2/1971 | Adams | 47—57.6 |
| 2,502,809 | 4/1950 | Vogelsang | 117—3 X |
| 2,967,376 | 1/1961 | Scott | 47—57.6 |

RALPH HUSACK, Primary Examiner

U.S. Cl. X.R.

47—57.6; 117—3, 26, 100 A